(12) United States Patent
Maze et al.

(10) Patent No.: US 11,582,496 B2
(45) Date of Patent: Feb. 14, 2023

(54) METHOD, DEVICE, AND COMPUTER PROGRAM FOR TRANSMITTING MEDIA CONTENT

(71) Applicant: CANON KABUSHIKI KAISHA, Tokyo (JP)

(72) Inventors: Frédéric Maze, Langan (FR); Franck Denoual, Saint Domineuc (FR); Naël Ouedraogo, Maure de Bretagne (FR); Jonathan Taquet, Talensac (FR); Tomoya Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 16/625,604

(22) PCT Filed: Jun. 20, 2018

(86) PCT No.: PCT/EP2018/066457
§ 371 (c)(1),
(2) Date: Dec. 20, 2019

(87) PCT Pub. No.: WO2019/002055
PCT Pub. Date: Jan. 3, 2019

(65) Prior Publication Data
US 2021/0409798 A1 Dec. 30, 2021

(30) Foreign Application Priority Data

Jun. 27, 2017 (GB) .................................. 1710264
Jun. 29, 2017 (GB) .................................. 1710463

(51) Int. Cl.
*H04N 21/236* (2011.01)
*H04N 21/235* (2011.01)
(Continued)

(52) U.S. Cl.
CPC ............... *H04N 21/23614* (2013.01); *H04N 21/2353* (2013.01); *H04N 21/4348* (2013.01); *H04N 21/816* (2013.01)

(58) Field of Classification Search
CPC ......... H04N 21/23614; H04N 21/2353; H04N 21/4348; H04N 21/816; H04N 21/21805; H04N 21/2389
(Continued)

(56) References Cited

U.S. PATENT DOCUMENTS

2015/0110118 A1  4/2015  Ouedraogo et al.
2015/0365687 A1  12/2015  Le Floch et al.
(Continued)

FOREIGN PATENT DOCUMENTS

CN  105556982 A  5/2016
CN  105684452 A  6/2016
(Continued)

OTHER PUBLICATIONS

Byeongdoo Choi, et al., Text of ISO/IEC DIS 23090-2 Omnidirectional Media Format, ISO/IEC JTC1/SC29/WG11 Coding of Moving Pictures and Audio, Apr. 2017, Hobart, AU, 62 pages, Doc. No. N16824.
(Continued)

*Primary Examiner* — Nnenna N Ekpo
(74) *Attorney, Agent, or Firm* — Canon U.S.A., Inc. IP Division

(57) ABSTRACT

The invention relates to a method for transmitting from a server to a client, encoded media data corresponding to a projection of a wide view of a scene, the method comprising: Encapsulating the encoded data into tracks, Wherein information is provided for signaling that the client needs to parse other encoded data to display at least the encoded data encapsulated in a given track.

10 Claims, 3 Drawing Sheets

(51) Int. Cl.
H04N 21/434 (2011.01)
H04N 21/81 (2011.01)
(58) Field of Classification Search
USPC .......................................................... 725/116
See application file for complete search history.

(56) References Cited

U.S. PATENT DOCUMENTS

| | | | |
|---|---|---|---|
| 2016/0165321 A1* | 6/2016 | Denoual | H04N 21/4382 725/116 |
| 2017/0118540 A1 | 4/2017 | Thomas et al. | |
| 2018/0279014 A1* | 9/2018 | Chen | G11B 27/031 |

FOREIGN PATENT DOCUMENTS

| | | |
|---|---|---|
| CN | 106664443 A | 5/2017 |
| EP | 3646612 A1 | 5/2020 |
| JP | 2016527810 A | 9/2016 |
| WO | 2016/199607 A1 | 12/2016 |

OTHER PUBLICATIONS

Jangwon Lee, et al., Comment on coverage information signaling in OMAF DIS, International Organisation for Standardisation, ISO/IEC JTC1/SC29/WG11, Coding of Moving Pictures and Audio, MPEG2016/M40797, Jul. 2017, 2 pages, XP30069141A.

Ye-Kui Wang, Berlin OMAF AHG meeting agenda and minutes, International Organisation for Standardisation, ISO/IEC JTC1/SC29/WG11, Coding of Moving Pictures and Audio, MPEG2017/M40805, Jul. 2017, 13 pages, XP30069149A.

Byeongdoo Choi, et al., OMAF DIS Text with Updates Based on Berlin OMAF AHG Meeting Agreements, International Organisation for Standardisation, ISO/IEC JTC1/SC29/WG11, Coding of Moving Pictures and Audio, M40849, Jul. 2017, 71 pages, XP30069193A.

Franck Denoual, et al., On Coverage Information Description in OMAF, International Organisation for Standardisation, ISO/IEC JTC1/SC29/WG11, Coding of Moving Pictures and Audio, MPEG2017/M41052, Jul. 2017, 5 pages, XP30069395A.

* cited by examiner

METHOD, DEVICE, AND COMPUTER PROGRAM FOR TRANSMITTING MEDIA CONTENT

FIELD OF THE INVENTION

The present invention relates to method and device for transmitting media data.

BACKGROUND OF THE INVENTION

The invention is related to encapsulating, parsing and streaming virtual reality media content, e.g. according to ISO Base Media File Format as defined by the MPEG standardization organization, to provide a flexible and extensible format that facilitates interchange, management, editing, and presentation of virtual reality media content and to improve its delivery for example over an IP network such as Internet using adaptive http streaming protocol.

The International Standard Organization Base Media File Format (ISO BMFF, ISO/IEC 14496-12) is a well-known flexible and extensible format that describes encoded timed media data bitstreams either for local storage or transmission via a network or via another bitstream delivery mechanism. This file format is object-oriented. It is composed of building blocks called boxes that are sequentially or hierarchically organized and that define parameters of the encoded timed media data bitstream such as timing and structure parameters. In the file format, the overall presentation is called a movie. It is logically divided into tracks. Each track represents a timed sequence of media data (frames of video, for example). Within each track, each timed unit of data is called a sample; this might be a frame of video or audio. Samples are implicitly numbered in sequence. The movie can be organized temporally as a list of movie and track fragments. The actual samples are in boxes called MediaDataBoxes. Within a movie fragment there is a set of track fragments, zero or more per track. The track fragments in turn contain zero or more track runs, each of which document a contiguous run of samples for that track.

To improve user experience and in particular to offer immersive experience, timed media data bitstreams (videos and even audio) may be omnidirectional (or multi-directional or pluri-directional). When applied to videos, also known as 360° panoramic video, the user feels to be located in the scene that is displayed.

An omnidirectional video may be obtained from a 360° camera and/or by combining images of video streams obtained from several cameras, for example mounted on a special rig so that all the cameras have a common nodal point. Such a combination of images is known as image stitching or camera stitching.

Such an omnidirectional video may be rendered via head mounted displays according to the user's viewing orientation or through projection onto a curved screen surrounding users. It may also be displayed on traditional 2D screens with navigation user interface to pan into the omnidirectional video according to user's desired part of the omnidirectional video (also known as viewport). It is often referred to as virtual reality (VR) since the user feels to be in a virtual world. When virtual objects are added to the omnidirectional video, it is referred to as augmented reality (AR).

FIG. 1 illustrates an example of data flow for capturing, transmitting, and rendering an omnidirectional media from a server device 101 to a client device 170 (also illustrated as 170').

As illustrated, this media has a video content acquired from camera system 100 and delivered to head-mounted display (HMD) 170 and 170'. The delivery 160 may be performed for example over an IP network 163 such as Internet using an adaptive http streaming protocol via the streaming server 161 and the streaming client 162.

For the sake of illustration, the used camera system 100 is based on a set of six standard cameras, associated with each face of a cube. It is used to capture (step 110) images representing the real scene surrounding the camera system. According to this arrangement, one camera provides front images, one camera provides rear images, one camera provides left images, one camera provides right images, one camera provides bottom images, and one camera provides top images.

The images obtained from camera system 100 are processed (step 120) in server 101 to create 360 images forming an omnidirectional video stream also called a 360 video stream or a virtual reality media data stream.

The processing step 120 consists in stitching and projecting captured images of the same time instance. Images are first stitched and projected onto a three-dimensional projection structure representing a sphere 121 forming a 360° view in both horizontal and vertical dimensions. The 360 image data on the projection structure is further converted onto a two-dimensional projected image 122 (also denoted a capturing projection), for example using an equirectangular projection (https://en.wikipedia.org/wiki/Equirectangular_projection). The projected image covers the entire sphere.

Alternatively, if the omnidirectional media is a stereoscopic 360-degree video, the camera system 100 may be composed of multiple cameras capturing at step 110 image sequences representing a left view and a right view that can be used later on by the client to render a three-dimensional 360-degree scene. In such a case, the processing step 120 described above is applied on both left-view and right-view images sequences separately. Optionally, at step 125, frame packing may be applied to pack each left view image and right view image of the same time instance onto a same projected image resulting on one single left+right projected images sequence. Several stereoscopic frame packing arrangements are possible, for instance, side-by-side, top-bottom, column based interleaving, row based interleaving, temporal interleaving of alternating left and right views. Alternatively, a stereoscopic frame packing arrangement may also consist in keeping left and right views in separate and independent projected images sequence resulting in independent video bitstreams after the encoding step 140. For example, one video bitstream represents the left view images and the other one does the right view images.

Optionally, region-wise packing 130 is then applied to map the projected image 122 onto a packed image 131. Region-wise packing consists in applying transformation, resizing, and relocating of regions of a projected image in order for instance to maximize signal information on the most useful parts of the sphere for the user. It can be noted that the packed image may cover only a part of the entire sphere. If the region-wise packing is not applied, the packed image 131 is identical to the projected image 122. In case of stereoscopic omnidirectional media, region-wise packing applies either on the left+right projected images sequence, or separately on the left-view and right-view projected images sequences depending on the frame packing arrangement chosen at step 125.

The projected images 122 are encoded at step 140 into one or several video bitstreams. In case of stereoscopic omnidirectional media, encoding step applies either on the left+ right packed images sequence, or separately on the left-view and right-view packed images sequences depending on the frame packing arrangement chosen at step 125. Alternatively, Multi-View encoding can be used on the left-view and right-view packed images sequences.

Examples of encoding formats are AVC (Advanced Video Coding), SVC (Scalable Video Coding), HEVC (High Efficiency Video Coding) or L-HEVC (Layered HEVC). In the following, HEVC is used to refer to both HEVC and to its layered extensions (L-HEVC).

HEVC and similar video encoding formats define different spatial subdivisions of samples, e.g. pictures: tiles, slices and slice segments. A tile defines a rectangular region of a picture that is defined by horizontal and vertical boundaries (i.e., rows and columns) and that contains an integer number of Coding Tree Units (CTUs) or coding blocks, all referred to hereinafter coding units. As such, tiles are good candidates to represent spatial sub-parts of a picture. However, coded video data (bitstream) organization in terms of syntax and its encapsulation into NAL units (or NALUs) is rather based on slices and slice segments (as in AVC).

A slice in HEVC is a set of slice segments, with at least the first slice segment being an independent slice segment, the others, if any, being dependent slice segments. A slice segment contains an integer number of consecutive (in raster scan order) CTUs. The slice does not necessarily have a rectangular shape (it is thus less appropriate than tiles for spatial sub-part representations). A slice segment is encoded in the HEVC bitstream as a slice segment header followed by slice segment data. Independent slice segments (ISS) and dependent slice segments (DSS) differ by their header: the dependent slice segment has a shorter header because reusing information from the independent slice segment's header. Both independent and dependent slice segments contain a list of entry points in the bitstream.

When a video bitstream is encoded with tiles, tiles can be motion-constrained to ensure that tiles do not depend from neighborhood tiles in the same picture (spatial dependency) and from neighborhood tiles in previous reference pictures (temporal dependency). Thus, motion-constrained tiles are independently decodable.

Alternatively, the packed image can be split into several spatial sub-pictures before encoding, each sub-picture being encoded independently forming for instance an independent encoded HEVC bitstream.

Therefore, as result of the encoding step 140, the packed image 131 can be represented by one or more independent encoded bitstreams or by at least one encoded bitstream composed of one or more independently encoded sub-bitstreams.

Those encoded bitstreams and sub-bitstreams are then encapsulated at step 150 in a file or in small temporal segment files 165 according to an encapsulation file format, for instance according to ISO Base Media File Format and Omnidirectional MediA Format (OMAF) as defined by the MPEG standardization organization. The resulting file or segment files can be mp4 file or mp4 segments. During the encapsulation, audio stream may be added to the video bitstream as well as metadata tracks providing information on the video or on the audio streams.

The encapsulated file or segment files are then delivered to client 170 via a delivery mechanism 160, for example over Internet using http (HyperText Transfer Protocol) protocol or on a removable digital medium such as for example a disk. For the sake of illustration, the delivery 160 is performed using an adaptive streaming over HTTP such as DASH (Dynamic Adaptive Streaming over HTTP) from the MPEG standardization committee ("ISO/IEC 23009-1, Dynamic adaptive streaming over HTTP (DASH), Part1: Media presentation description and segment formats"). This standard enables association of a compact description of the media content of a media presentation with HTTP Uniform Resource Locations (URLs). Such an association is typically described in a file called a manifest file or a description file 164. In the context of DASH, this manifest file is an XML file also called the MPD file (Media Presentation Description).

By receiving an MPD file, a client device 170 gets the description of each media content component. Accordingly, it is aware of the kind of media content components proposed in the media presentation and knows the HTTP URLs to be used for downloading, via the streaming client 162, the associated media segments 165 from the streaming server 161. Therefore, the client 170 can decide which media content components to download (via HTTP requests) and to play (i.e. to decode and to play after reception of the media segments).

It is to be noted that the client device can only get media segments corresponding to a spatial part of full packed images representing a wide view of the scene depending on the user's viewport (i.e. part of the spherical video that is currently displayed and viewed by the user). The wide view of the scene may represent the full view represented by the full packed image.

Upon reception, the encapsulated virtual reality media file or media segments are parsed during step 151 so as to extract a data stream that is decoded at step 141. In case of ISOBMFF file or segments received at step 151, the parsing is typically handled by an mp4 reader or mp4 parser that, from the descriptive metadata, can extract encapsulated video bitstreams and/or video sub-bitstreams.

Next, optionally, the packed images resulting from the decoding step 141 are unpacked to obtain the projected images that are then processed for video rendering (step 121) and displayed (step 111). It is to be noted that video rendering depends on several parameters among which is the point of view of the user, the point of sight, and the projection(s) used to create the projected images. As illustrated, rendering the video comprises a step of re-projecting on a sphere the decoded projected images. The images obtained from such a re-projection are displayed in the Head-Mounted display 170'.

For handling stereoscopic views, the process described by reference to FIG. 1 may be duplicated or partially duplicated.

It has been observed that stitching several images of UHD (Ultra High Definition) video streams into panorama images of a virtual reality media data stream leads to a very high bitrate and very high resolution virtual reality media data stream. Therefore, from a system's perspective and to avoid wasting bandwidth and to remain compliant with processing capabilities of the client players, there is a need to optimize access to the virtual reality media data.

Such a need is even more important that a virtual reality media data stream may be used for other purposes than the one described by reference to FIG. 1. In particular, a virtual reality media data stream can be used for displaying 360° images with specific displays like a 360° array of projectors. It can also be used to display particular field of view and/or change the point of view, the field of view, and the point of sight.

The inventors have noticed several problems when describing and signaling information about the media data to transmit, along the process described in reference to FIG. 1.

An example involves the signaling of tracks requesting a specific parsing process from the client, which generates overhead and is complex.

Another example concerns the signaling of stereo views is limited to a particular encapsulating process and is relatively costly.

Another example involves the signaling of the coverage in the encoded data in tracks. The existing solutions is complex and not fully compliant with the multi-tracks encapsulation process, when sub-picture tracks are encapsulated in several different tracks.

SUMMARY OF THE INVENTION

The present invention has been devised to address one or more of the foregoing concerns.

In this context, there is provided a solution for streaming media content (for example omnidirectional media content), for example over an IP network such as Internet using the http protocol.

According to one embodiment of the invention, there is provided a method for transmitting from a server to a client, encoded media data corresponding to a projection of a wide view of a scene, the method comprising:

encapsulating the encoded data into tracks, wherein information is provided for signaling that the client needs to parse other encoded data to display at least the encoded data encapsulated in a given track.

The one embodiment of the invention provides a simpler signaling for specific tracks, in particular the tracks defined as being "not intended to be presented alone" tracks in OMAF. It reduces signaling overhead and parsing complexity when OMAF content is split into sub-picture tracks, meaning tracks comprising data corresponding to a part of a picture for one or more time periods.

According to another embodiment of the invention, there is provided a method for parsing media files by a client, said media files comprising encoded media data corresponding to a projection of a wide view of a scene, the method comprising:

Obtaining track encapsulating the encoded data, from the media files,

Wherein the method comprises obtaining information for signaling that the client needs to parse other encoded data to display at least the encoded data encapsulated in a given track.

According to another embodiment of the invention, there is provided a device for transmitting from a server to a client, encoded media data corresponding to a projection of a wide view of a scene, the device comprising:

Means for encapsulating the encoded data into tracks,

Wherein the device further comprises means for providing information for signaling that the client needs to parse other encoded data to display at least the encoded data encapsulated in a given track.

According to another embodiment of the invention, there is provided a device for parsing media files by a client, said media files comprising encoded media data corresponding to a projection of a wide view of a scene, the device comprising:

Means for obtaining track encapsulating the encoded data, from the media files,

Wherein the device further comprises means for obtaining information for signaling that the client needs to parse other encoded data to display at least the encoded data encapsulated in a given track.

According to another embodiment of the invention, there is provided a method for transmitting from a server to a client, encoded media data corresponding to a projection of a wide view of a scene, the method comprising Encapsulating the encoded data into tracks, Obtaining descriptive metadata for each track, the descriptive metadata being organized into track containers, where a track container is related to a track, and Transmitting the tracks to the client, Wherein the obtaining step further comprising providing a first structure comprising information to indicate the coverage of the wide view represented by encoded data encapsulated in a first track and encoded data encapsulated in one or more tracks belonging to a common set defined in a first box of a first track container.

Said other embodiment the invention allows adopting a simpler signaling for the information indicating the coverage of the wide view, especially for multi-track OMAF content as media data.

According to another embodiment of the invention, there is provided a method for parsing media files by a client, said media files corresponding to encoded media data corresponding to a projection of a wide view of a scene, the method comprising Getting tracks encapsulating the encoded data, from the media files, Obtaining descriptive metadata from each track, the descriptive metadata being organized into track containers, where a track container is related to a track, Wherein the obtaining step further comprising obtaining a first structure comprising information to indicate the coverage of the wide view represented by encoded data encapsulated in a first track and encoded data encapsulated in one or more tracks belonging to a common set defined in a first box of a first track container.

According to another embodiment of the invention, there is provided a device for transmitting from a server to a client, encoded media data corresponding to a projection of a wide view of a scene, the device comprising Means for encapsulating the encoded data into tracks, Means for obtaining descriptive metadata for each track, the descriptive metadata being organized into track containers, where a track container is related to a track, and Means for transmitting the tracks to the client, Wherein the obtaining means comprising Means for providing a first structure comprising information to indicate the coverage of the wide view represented by encoded data encapsulated in a first track and encoded data encapsulated in one or more tracks belonging to a common set defined in a first box of a first track container.

According to another embodiment of the invention, there is provided a device for parsing media files by a client, said media files corresponding to encoded media data corresponding to a projection of a wide view of a scene, the device comprising Means for getting tracks from the media files, Means for obtaining descriptive metadata from each track, the descriptive metadata being organized into track containers, where a track container is related to a track, Wherein the obtaining means comprising Other means for obtaining a first structure comprising information to indicate the coverage of the wide view represented by encoded data encapsulated in a first track and encoded data encapsulated in one or more tracks belonging to a common set defined in a first box of a first track container.

According to another embodiment of the invention, there is provided a method for transmitting from a server to a client, encoded video data corresponding to a projection of a wide view of a scene, the method comprising:

Encapsulating encoded video data corresponding to stereoscopic video content in at least a first and a second track related to each other, Obtaining descriptive metadata for each track, the descriptive metadata being organized into track containers, where a track container is related to a track, Wherein the method further comprises providing in the first track and in the second track, information about the stereo video content respectively encapsulated in the considered track, in one box per track container.

This other embodiment of the invention allows keeping a very simple signalling, in particular when reuses existing box from ISOBMFF and that avoids duplicated signaling.

According to another embodiment of the invention, there is provided a method for parsing media files by a client, said media files corresponding to encoded video data corresponding to a projection of a wide view of a scene, the method comprising:

Getting encoded video data corresponding to stereoscopic video content from at least a first and a second track related to each other, from the media files Obtaining descriptive metadata for each track, the descriptive metadata being organized into track containers, where a track container is related to a track, Wherein the method further comprises obtaining in the first track and in the second track, information about the stereo video content respectively encapsulated in the considered track, in one box per track container.

According to another embodiment of the invention, there is provided a device for transmitting from a server to a client, encoded video data corresponding to a projection of a wide view of a scene, the device comprising:

Means for encapsulating encoded video data corresponding to stereoscopic video content in at least a first and a second track related to each other, Means for obtaining descriptive metadata for each track, the descriptive metadata being organized into track containers, where a track container is related to a track, Wherein the device further comprises Means for providing in the first track and in the second track, information about the stereo video content respectively encapsulated in the considered track, in one box per track container.

According to another embodiment of the invention, there is provided a device for parsing media files by a client, said media files corresponding to encoded video data corresponding to a projection of a wide view of a scene, the device comprising:

Means for getting encoded video data corresponding to stereoscopic video content from at least a first and a second track related to each other, from the media files Means for obtaining descriptive metadata for each track, the descriptive metadata being organized into track containers, where a track container is related to a track, Wherein the device further comprises Means for obtaining in the first track and in the second track, information about the stereo video content respectively encapsulated in the considered track, in one box per track container.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which.

DETAILED DESCRIPTION OF EMBODIMENTS OF THE INVENTION

Figure 1:
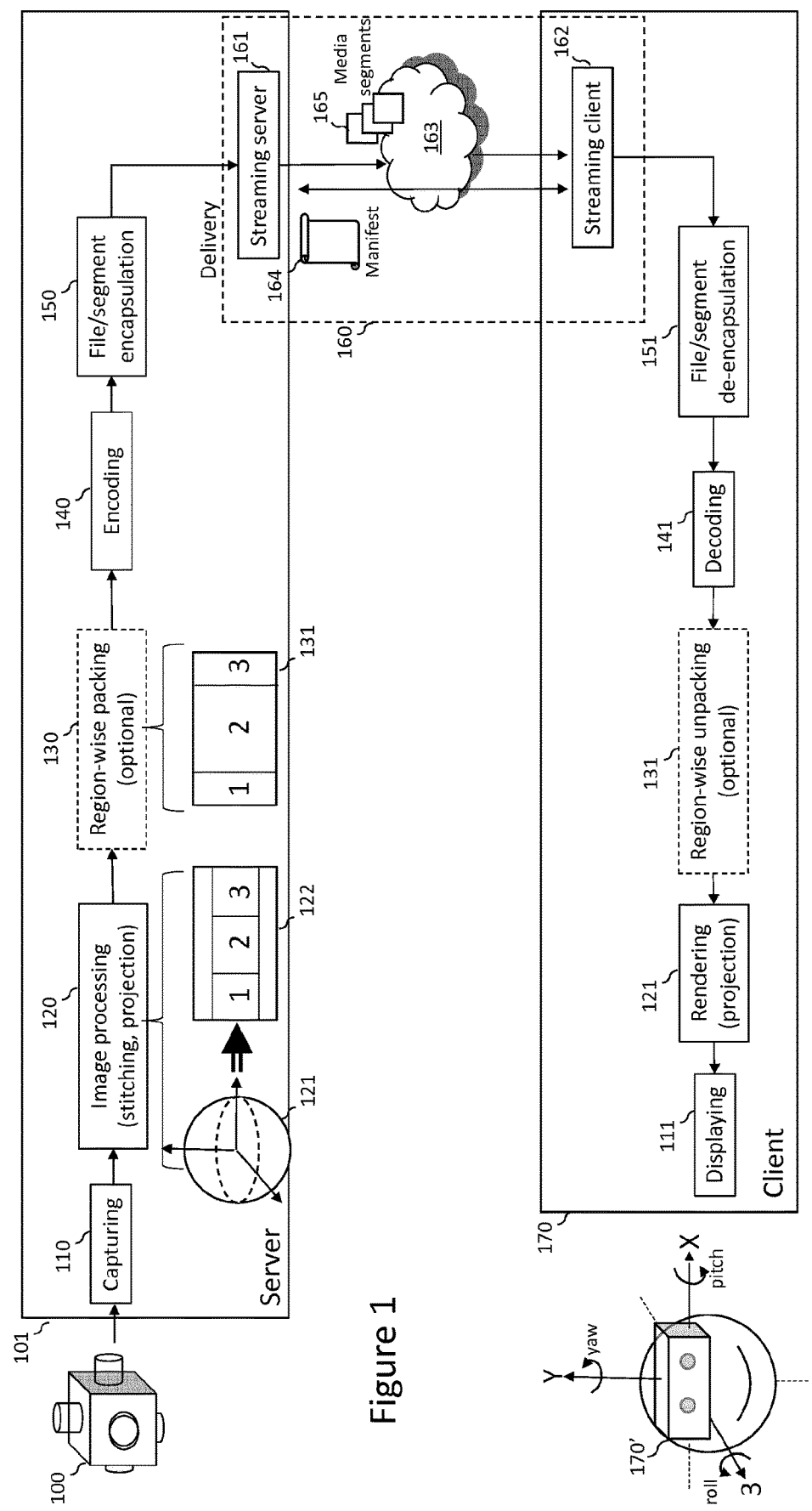
FIG. 1 illustrates an example of a data flow for capturing, processing, encapsulating, transmitting, and rendering an omnidirectional video from a server to a client.

According to particular embodiments, encoded bitstreams and sub-bitstreams resulting from the encoding of a packed image 131 (step 140 of FIG. 1) are encapsulated into a file or into small temporal segment files according to an encapsulation file format, for instance ISO Base Media File Format (ISO/IEC 14496-12 and ISO/IEC 14496-15), Omnidirectional MediA Format (OMAF) (ISO/IEC 23090-2) and associated specifications as defined by the MPEG standardization organization.

An encoded bitstream (e.g. HEVC) and possibly its sub-bitstreams (e.g. tiled HEVC, MV-HEVC, scalable HEVC), can be encapsulated as one single track. Alternatively multiple encoded bitstreams that are spatially related (i.e. are sub-spatial parts of a projected image) can be encapsulated as several sub-picture tracks. Alternatively, an encoded bitstream (e.g. tiled HEVC, MV-HEVC, scalable HEVC) comprising several sub-bitstreams (tiles, views, layers) can be encapsulated as multiple sub-picture tracks.

A sub-picture track is a track embedding data for a sub part of a picture or image. A sub-picture track may be related to other sub-picture tracks or to the track describing the full picture the sub-picture is extracted from. For example a sub-picture track can be a tile track. It can be represented by an AVC track, an HEVC track, an HEVC tile track or any compressed video bitstream encapsulated as a sequence of samples.

A tile track is a sequence of timed video samples corresponding to a spatial part of an image or to a sub-picture of an image or picture. It can be for example a region of interest in an image or an arbitrary region in the image. The data corresponding to a tile track can come from a video bitstream or can come from a sub part of a video bitstream. For example a tile track can be an AVC or HEVC compliant bitstream or can be a sub-part of AVC or HEVC or any encoded bitstream, like for example HEVC tiles. In a prefered embodiment a tile track is independently decodable (encoder took care to remove motion prediction from other tiles). When tile track corresponds to a video bitstream encoded in HEVC with tiles, it can be encapsulated into an HEVC Tile track denoted as 'hvt1' track as described in ISO/IEC 14496-15 4th edition. It can then refer to a tile base track to obtain parameter sets, high level information to set up the video decoder. It can also be encapsulated into a HEVC track 'hvc1' or 'hev1' track. A tile track can be used for spatial composition of sub-pictures into a bigger image or picture.

A tile base track is a track common to one or more tile tracks that contain data or metadata that is shared among these one or more tracks. A tile base track may contain instructions to compose images from one or more tile tracks. Tile tracks may depend on a tile base track for complete decoding or rendering. When tile base track derives from a video bitstream encoded in HEVC with tiles, it is encapsulated into an HEVC track denoted as 'hvc2' or 'hev2' track. In addition it is referenced by HEVC tile tracks via a track reference 'tbas' and it shall indicate the tile ordering using a 'sabt' track reference to the HEVC tile tracks as described in ISO/IEC 14496-15 4th edition.

A composite track (also denoted reference track) is a track that refers to other tracks to compose an image. One example of composite track is, in case of video tracks, a track composing sub-picture tracks into a bigger image. This can be done by post-decoding operation, for example in a track deriving from video tracks that provides transformation and transformation parameters to compose the images from each video track to a bigger image. A composite track can also be a track with extractor NAL units providing instructions to extract NAL units from other video tracks or tile tracks to form before decoding a bitstream resulting from sub-bitstream concatenation. A composite track can also be a track that implicitly provides composition instructions, for example through track references to other tracks.

ISO/IEC 14496-12 provides a box located at track level to describe groups of tracks, where each group shares a particular characteristic or the tracks within a group have a particular relationship. The particular characteristic or the relationship is indicated by the box type (track_group_type) of the contained boxes. The contained boxes include an identifier (track_group_id), which can be used to determine the tracks belonging to the same track group. All the tracks having a track group box with the same track_group_type and track_group_id values are part of the same track group. THE MPEG OMAF standard is proposing a specific track group for spatial composition as a TrackGroupTypeBox of type 'spco'. The samples of each track in an 'spco' track group can be spatially composed with samples (at the same composition or decoding time) from other tracks in this same group to produce a bigger image.

Depending on encoded bitstreams and sub-bitstreams resulting from the encoding of a packed image 131 (step 140 of FIG. 1), several variants of encapsulation in file format are possible.

Figure 2:
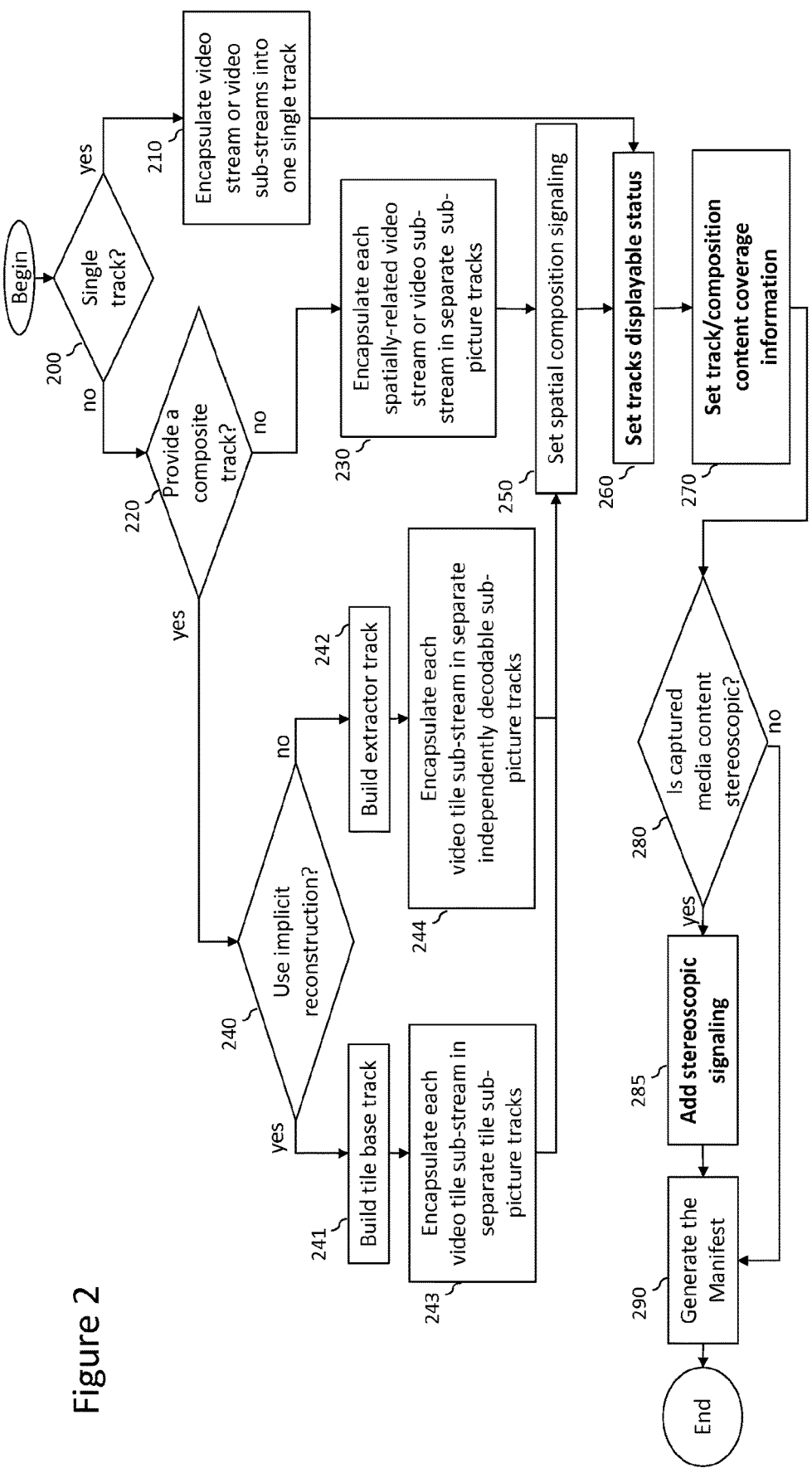
FIG. 2 illustrates a block diagram illustrating an example of encapsulation according to embodiments of the invention.

FIG. 2 illustrates a block diagram illustrating an example of file/segment encapsulation (step 150 of FIG. 1) according to an embodiment of the invention.

At step 200, the server obtains encoded media data to be encapsulated into tracks. The server determines if there are several spatially-related video bitstreams (i.e. representing spatial sub-part of packed images and for which a spatial composition may create a bigger image) or if there are video bitstreams comprising video sub-bitstreams representing either motion-constrained tiles or multiple views that can be exposed to the client as multiple sub-picture tracks. If the encoded packed image cannot be exposed as multiple tracks because it is encoded as a single video bitstream or the content creator does not wish to expose the encoded packed image as multiple tracks, then video bitstream or video sub-bitstreams are encapsulated into one single track (step 210). Otherwise, it is determined at step 220 if the media content to be encapsulated is composed of video sub-bitstreams representing motion-constrained tiles. If yes, at least one composite track may need to be provided to represent at least one composition of several tile tracks. The composition may represent the full packed images or only a sub-part of the full packed images. Using a composite track with tile tracks avoids requiring separate rendering and decoding of streams on the client-side. The number of possible combinations to be exposed to the client depends on content creator's choices. For instance, the content creator may want to combine tiles with different visual qualities depending on current user's viewport. For this, it can encode several times a packed image with different visual qualities and propose several composite tracks representing the full packed image comprising different combination of tiles in terms of visual qualities. By combining tiles at different qualities depending on user's viewport, the content creator can reduce the consumption of network resources.

If at step 220, it is determined that composite tracks must be provided, it is then determined if implicit reconstruction can be used or not for the composite track (step 240).

Implicit reconstruction refers to bitstream reconstruction from tile base and tile tracks, for instance as defined in ISO/IEC 14496-15 4th edition. Rather than using in-stream structure such as extractors to re-build samples of a composite track from samples of tile tracks by replacing extractors in composite track's samples by the data they reference in tile tracks' samples, implicit reconstruction allows re-building composite track's samples by concatenating samples of the composite track and tile tracks in the order of track references (e.g. 'sabt' track references in HEVC implicit reconstruction).

The use of implicit reconstruction depends on the scenario of use. When the composition of several tile tracks requires a rearrangement of the tiles at the decoding compared to the order of tiles at the encoding, then some slice addresses must be rewritten. In such a case, implicit reconstruction is not possible and explicit reconstruction with extractors must be selected.

If implicit reconstruction is possible, a tile base track is generated (step 241), and the video sub-bitstreams are encapsulated as tile tracks not decodable independently (e.g. as HEVC 'hvt1' tracks).

Otherwise an extractor track is generated (step 242), and the video sub-bitstreams are encapsulated as tile tracks decodable independently (e.g. as HEVC 'hvc1' or 'hev1' tracks).

Going back to step 220, if the media content does not contain tile sub-bitstreams or the content creator does not want to create and expose composite tracks, then spatially-related video bitstreams or video sub-bitstreams (e.g. tile or multiple views) are encapsulated into separate sub-picture tracks (step 230). In such particular case, if the tile sub-bitstreams are HEVC tiles, they are encapsulated as HEVC track 'hvc1' or 'hev1' track.

At step 250, signaling for spatial composition is added to group together spatially-related video bitstreams or video sub-bitstreams. Spatial composition signaling can be provided by defining a specific TrackGroupTypeBox in each track (sub-picture tracks, tile tracks, composite tracks) that composes the group, for instance a track group of type 'spco' with same track_group_id for all tracks pertaining to the same group as defined in MPEG OMAF and as illustrated below:

```
aligned(8) class TrackGroupTypeBox(unsigned int(32) track_group_type)
extends FullBox(track_group_type, version = 0, flags = 0)
{
    unsigned int(32) track_group_id;
    // the remaining data may be specified for a particular track_group_type
}
aligned(8) class SubPictureCompositionBox extends
```

```
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

This track group box would provide the relative two-dimensional coordinates of the track within the composition and the overall size of the image formed by the composition. The composition may represent entire packed images or only a sub-part of packed images. For instance, the content creator may want to expose multiple composite tracks allowing building the entire packed images or only sub-part of packed images.

As an alternative, the SubPictureCompositionBox('spco') can only define the parameter composition_width and composition_height representing the width and height of the composition picture as follows:

```
aligned(8) class SubPictureCompositionBox extends
TrackGroupTypeBox('spco') {
    unsigned int(16) composition_width;
    unsigned int(16) composition_height;
}
```

And two-dimensional coordinates of the track within the composition can be given either as a new fullBox defined in a VisualSampleEntry as follows:

```
aligned(8) class 2DCoordinateInTrackGroupBox extends FullBox('2dco',
version, flags)
{
    unsigned int(32) track_group_id;
    unsigned int(32) track_subgroup_id;
    unsigned int(16) track_x;
    unsigned int(16) track_y;
    unsigned int(16) track_width;
    unsigned int(16) track_height;
}
``` or a new generic sample group description entry as follows:

```
class 2DCoordinateInTrackGroupBox extends
VisualSampleGroupEntry('2dco')
{
    unsigned int(32) track_group_id;
    unsigned int(32) track_subgroup_id;
    unsigned int(16) track_x;
    unsigned int(16) track_y;
    unsigned int(16) track_width;
    unsigned int(16) track_height;
}
``` track_group_id provides the identifier of the associated track group. Thus a track can be associated to multiple track groups at different locations within each track group. track_subgroup_id provides a subgroup identifier. All track having the track_subgroup_id within a track group pertain to the same track sub-group.

track_x, track_y provides the horizontal and vertical position of the top-left corner of samples of this track within the composition.

track_width, track_height provides the width and height of the samples of this track within the composition.

Those parameters directly match the parameters of the DASH Spatial-Relationship Description (SRD) descriptor (defined in ISO/IEC 23009-1 $3^{rd}$ edition) that can be used in a DASH manifest to describe the spatial relationship of Adaptation Sets representing those tracks.

track_group_id would match the DASH SRD source_id parameter.

track_subgroup_id would match the DASH SRD spatial_set_id parameter.

track_x, track y, track_width, track_height would match the DASH SRD parameters object_x, object_y, object_width, object_height parameters respectively.

Finally, composition_width and composition_height from the associated track group (via the track_group_id) would match the DASH SRD total_width, total_height parameters.

As an alternative, in case there is a composite track, spatial composition signaling can be provided implicitly by this composite track. Indeed, in case the composite track is a tile base track, the tile base track refers to a set of tile tracks via a track reference of type 'sabt'. This tile base track and set of tile tracks forms a composition group. Similarly, if the composite track is an extractor track, the extractor track refers to a set of tile tracks via a track reference of type 'scal'. This extractor track and set of tile tracks also forms a composition group. In both cases, relative two-dimensional coordinates of each tile track within the composition can be provided by defining a sample grouping or default sample grouping of type 'trif' as defined in ISO/IEC 14496-15 $4^{th}$ edition.

As another alternative, spatial composition signaling can be provided by defining a new entity group. An entity group is a grouping of items or tracks. Entity groups are indicated in a GroupsListBox in a MetaBox. Entity groups referring to tracks may be specified in GroupsListBox of a file-level MetaBox or in GroupsListBox of a movie-level MetaBox. The GroupListBox ('grpl') contains a set of full boxes, each called an EntityToGroupBox, with an associated four-character codes denoting a defined grouping type. The EntityToGroupBox is defined as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
    // the remaining data may be specified for a particular
    grouping_type
}
```

Typically group_id provides the id of the group and the set of entity_id provides the track_ID of the tracks that pertains to the entity group. Following the set of entity_id, it is possible to extend the definition of the EntityToGroupBox by defining additional data for a particular grouping_type. According to an embodiment, a new EntityToGroupBox with for instance grouping_type equal to 'egco' (for Entity Group Composition) can be defined to describe the composition of spatially-related video bitstreams or video sub-bitstreams. The set of entity_id would contains the set of track_ID of tracks (sub-pictures, tile tracks, composite tracks) that composes a group. The overall size of the image formed by the composition can be provided as part of additional data associated to this new grouping_type 'egco'.

EntityToGroupBox ('egco') would be defined as follows:

```
aligned(8) class EntityToGroupBox('egco', version, flags)
extends FullBox('egco', version, flags) {
    unsigned int(32) group_id;
    unsigned int(32) num_entities_in_group;
    for(i=0; i<num_entities_in_group; i++)
        unsigned int(32) entity_id;
    unsigned int(16) composition_width;
    unsigned int(16) composition_height;
}
```

The relative two-dimensional coordinates of each track within the composition defined by an entity grouping of type 'egco' can be provided by defining a sample grouping or default sample grouping of type 'trif' in each tile track as defined in ISO/IEC 14496-15 $4^{th}$ edition. As an alternative, relative two-dimensional coordinates can be defined as a new generic full box 2DCoordinateForEntityGroupBox ('2dcd') that would be located in VisualSampleEntry in each tile track pertaining to a group.

```
aligned(8) class 2DCoordinateForEntityGroupBox extends
FullBox('2dco',
version, flags)
{
    unsigned int(32) entity_group_id;
    unsigned int(16) track_x;
    unsigned int(16) track_y;
    unsigned int(16) track_width;
    unsigned int(16) track_height;
}
``` entity_group_id provides the identifier of the associated EntityToGroupBox('egco') defining the group.

track_x, track_y provides the horizontal and vertical position of the top-left corner of samples of this track within the composition.

track_width, track_height provides the width and height of the samples of this track within the composition.

As an alternative, this new generic box 2DCoordinate-ForEntityGroupBox('2dcd') can be defined as a new sample grouping as follows:

```
class 2DCoordinateForEntityGroupBox extends
VisualSampleGroupEntry('2dco')
{
    unsigned int(32) entity_group_id;
    unsigned int(16) track_x;
    unsigned int(16) track_y;
    unsigned int(16) track_width;
    unsigned int(16) track_height;
}
```

At step 260, information relating to necessity of data for decoding encoded media data encapsulated in a given track is obtained. Additional signalling based on this information is associated to tracks. Signalling is added to inform the client if a track is not sufficient for presentation or not intended to be presented alone.

Indeed some tracks may only contain partial bitstreams that cannot be decoded alone. For instance, this can be the case for some tile tracks of type 'hvt1' that cannot be decoded without their associated tile base track.

In addition the content creator may wish to inform the client that some tracks are not intended to be presented alone and do not constitute an entry point in the media presentation.

The encoded media data and the information relating to necessity of data for decoding encoded media data encapsulated in a given track are encapsulated within one or more media files. Indeed, when an ISOBMFF file contains multiple video tracks, having one or more of these video tracks signaled as a main track helps media player in the selection of tracks to expose to a user or to expose in a streaming manifest. Main track signaling provides entry points for media players into the media file. Indeed, instead of having a long list of tracks with same level of importance, some are annotated or described as having more importance and to be processed in priority by the players as a kind of primary item.

In a first embodiment, the information that a track is not intended to be displayed alone can be signaled in track header. Each track has a track header box 'tkhd' (mandatory) that specifies some track's characteristics. As an ISOBMFF full box, this track header box has a 24-bit flags parameter that can be used for specific signaling associated to the box. The value of the track header's flags for media tracks is already used to provide information on how the track is used in a presentation (e.g. Track_enabled, Trak_in_movie, Track_in_preview). In order to indicate whether a video track is "intended to be presented alone" or not, a new specific value "Track_non_displayable_alone" for flags could be defined in the track header box. This new flag is defined as follows:

"Track_non_displayable_alone": =0x000010 indicates that track is not intended to be displayed alone and cannot be used for preview (overrides the Track_in_preview flags value). By default this flags value is not set. It can be noted that the default value of the track header flags would remain unchanged: still equal to 7 (track_enabled 0x1, track_in_movie 0x2, track_in_preview 0x4).

In a second embodiment, tracks that are not intended to be displayed alone can be defined as auxiliary tracks. An auxiliary track is coded the same as a video track, but uses the handler type value 'auxv' instead of 'vide' in the HandlerBox of the MediaBox, and is not intended to be visually displayed. As an alternative, new handler types 'subv' for video and 'suba' for audio can be defined to signal that a track is the same as a video or audio track respectively but they are not sufficient for presentation or not intended to be presented alone.

In a third embodiment, the information that a track is not sufficient for presentation or not intended to be presented alone can be signalled as part of track group information. Indeed the tracks mapped to a sub-picture composition track group (i.e. the tracks that have the same value of track_group_id within TrackGroupTypeBox with track_group_type equal to 'spco') collectively represent visual content that can be presented. But each individual track mapped to this grouping may or may not be intended to be presented alone without other tracks. A simple alternative consists in defining a new parameter "not_output_track" in the 'spco' box indicating whether the track is "intended to be presented alone" or not.

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
```

```
        unsigned int(8) not_output_track;
}
```

In an alternative embodiment, this parameter can be represented with a single bit, letting the other 7 bits reserved for future use or other signaling as follows:

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
    unsigned int(1) not_output_track;
    unsigned int(7) reserved;
}
``` not_output_track when set to 1 indicates that the track is not intended to be displayed alone. By default it is assumed to be zero and the track is selectable for presentation to a user. As well, when a track does not contain any SubPictureCompositionBox, it is assumed to be displayable alone.

In a fourth embodiment, the information that a track is not sufficient for presentation or not intended to be presented alone can be inferred from other track information or combination of other track information.

For instance, the displayable status of a track could be detected based on the track reference box Oren that provides the dependencies of a track and SampleEntry (VisualSampleEntry for a video) that provides common definition for the samples in a track.

For instance, if the track has track reference of type 'sabt', and it is referred by some other tracks with a track reference of type 'tbas' then the track is marked as tile base track and is marked as playable/selectable track. All referenced tracks from this track via the track reference 'sabt' can be marked as a tile track ('hvt1') if they have a VisualSampleEntry of type 'hvt1' and marked as a non-playable track. Alternatively, if a track has a track reference of type 'tbas' and a VisualSampleEntry of type 'hvt1', then the track is marked as Tile Track ('hvt1') and is marked as non-playable track. All referenced tracks from this track are marked as tile base track and marked as a non-playable track. Alternatively, if the track has a track reference of type 'scal', then the track is Extractor track and is marked as playable track. All referenced tracks from this track are marked as possibly playable Tile tracks ('hvc1'). By default, they can be marked as a playable track. But the content creator may prefer to mark them as non-playable track by default. Moreover, if a track does not contain any track reference ('tref') box and does not pertain to a track group, then the SampleEntry should be checked. If the track is detected as 'hvc1' or 'hev1', the track is at least marked as play able track.

In a fifth embodiment, as an alternative to third embodiment, if two-dimensional coordinates (track_x, track_y, track_width and track_weight) are not defined in SubPictureCompositionBox('spco'), the parameter not_output_track can still be defined in SubPictureCompositionBox ('spco') as illustrated below:

```
aligned(8) class SubPictureCompositionBox extends
TrackGroupTypeBox('spco') {
    unsigned int(16) composition_width;
    unsigned int(16) composition_height;
    unsigned int(1) not_output_track;
    unsigned int(7) reserved;
}
``` or the parameter not_output_track can be defined in 2DCoordinateInTrackGroupBox( ) or in 2DCoordinateForEntityGroupBox( ) or similar boxes defined at VisualSampleEntry or Sample Group Description entry levels.

Still at step 260, similarly explicitly signalling can be added for identifying main tracks or partial tracks.

A main track in a media file is a track that is considered as having more importance than tracks with the same media type or than related tracks with different media types. For example, a main video track is a track a media player should expose to a user for selection and playback. As well, a main track should be exposed in a streaming manifest when the media file is to be streamed or transmitted. For example, in case of spatial composition of sub-pictures or tiles, a main track could be a composite track. Again, in case of spatial composition, a main track could be the video track corresponding to the full picture (in opposition to sub-picture or tile tracks). In a set of tracks to be rendered by a player, a main track can be the one to render in priority. In a transmission context, the main track is the one to fetch in priority. For example a main track in a media file can be described in a streaming manifest as a main media component. For example, in MPEG DASH manifest a main track can be the main AdaptationSet of a Preselection element, or an AdaptationSet with Role descriptor having the "main" value or a Label indicating it is a main track. This invention describes different ways of signaling a main track in a media file.

A partial track in a media file is a track that may only be processed in combination with a main track or in combination with a main track and other partial tracks. Tile tracks of type 'hvt1' are examples of partial tracks. They can only be processed in combination with a tile base track.

Main/partial track signaling can be signaled similarly to the signaling of "not sufficient for presentation or not intended to be presented alone" signalling described above. It can be signalled by an explicit flag value in track header flags (e.g. "Is_Main_Track": =0x000020), or by a new specific parameter "main_track" in sub-picture composition track group ('spco') box as illustrated below:

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
    unsigned int(1) main_track;
    unsigned int(7) reserved;
}
```

This parameter main_track can be used to indicate that a track in the track group is the main track or the full picture track. In this case, parsers consider that only this main track or full picture track in the track group should be rendered (not the other tracks in the group having this parameter set to value 0). In other words, the other tracks are considered as partial tracks.

As an alternative, the main track can be signaled using a KindBox ('kind') in a UserDataBox ('udta') in a track. The KindBox allows labeling a track with its role or kind. The main track would be signaled by defining a KindBox with a specific schemeURI, for instance "urn:mpeg:14496-12:main"

A mp4 writer can exploit the main track signaling to set the main track as the main adaptation set in a DASH Preselection element and to set the partial tracks as "hidden" adaptation sets in a DASH MPD. "Hidden" adaptation sets are adaptation set that are not intended to be selected by a user. They can be explicitly signaled in a DASH MPD by defining an associated Supplemental or Essential descriptor with a specific @schemeIdURI set for instance to "urn:mpeg:dash:not-selectable:2016".

At step 270, content coverage information for the track and for compositions of tracks is added to the metadata describing the encapsulation of video bitstreams or video sub-bitstreams.

Track coverage information provides information on the area on the sphere covered by the content represented by this track.

Composition coverage information provides information on the area on the spherical surface that is associated with the combination of one or more tracks. For example, when a movie file contains multiple video tracks with spatial relationships, the composition coverage information is the area on the spherical surface that is covered by the spatial composition of these multiple video tracks. In another example, a media file contains multiple video tracks and a transformation matrix that indicates how to render this set of tracks, the composition coverage information then corresponds to the area covered by the assembled set of tracks. A "composition coverage information" can also be denoted "global coverage information" or "track group composition information". A composition or global coverage information can also describe the area on the spherical surface resulting from the composition of a subset of these multiple video tracks.

As a first embodiment, track coverage information and composition coverage information can be signaled using a single common CoverageInformationBox without additional signaling. In such a case, the scope of the CoverageInformationBox depends on the location of the definition of this box in the box hierarchy. Clients could determine whether the coverage information relates to track content or to the entire content just by considering where it is declared. According to this embodiment, the CoverageInformationBox is defined as follows:

Where coverage_shape_type specifies the shape of the covered sphere region and SphereRegionStruct( ) is defined as follows:

```
aligned(8) SphereRegionStruct(range_included_flag) {
    signed int(32) center_yaw;
    signed int(32) center_pitch;
    singed int(32) center_roll;
    if (range_included_flag) {
        unsigned int(32) hor_range;
        unsigned int(32) ver_range;
    }
    unsigned int(1) interpolate;
    bit(7) reserved = 0;
}
```

Where center_yaw, center_pitch, and center_roll specify the viewport orientation of the covered area relative to global coordinate axes, hor_range and ver_range, when present, specify the horizontal and vertical ranges, respectively, of the covered sphere region and interpolate is currently not used.

Accordingly CoverageInformationBox provides information on the area on the sphere covered by the content. The nature of the content depends on the Container of this box. When present in a SubPictureCompositionBox 'spco', the content refers to the entire content represented by all tracks belonging to the same sub-picture composition track group and a composition picture composed from these tracks is referred to as a packed picture of the entire content. When present in a sample entry of a track, the content refers to the content represented by this track itself, and the picture of a sample in this track is referred to as a packed picture of the entire content. When no CoverageInformation Box is present for a track, it indicates that the content covers the entire sphere.

It is to be noted that Projected omnidirectional video box ('povd') is an intermediate box defined by MPEG OMAF and located into a VisualSampleEntry in a track.

In addition, the SubPictureComposition track group box ('spco') is modified as follows:

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
    CoverageInformationBox( );
}
```

Box Type:     'covi'
Container:    Projected omnidirectional video box ('povd') or SubPictureCompositionBox ('spco')
Mandatory:    No
Quantity:     Zero or one

```
aligned(8) class CoverageInformationBox extends FullBox('covi',
version = 0, flags) {
    unsigned int(8) coverage_shape_type;
    SphereRegionStruct(1);
}
```

As an alternative rather than adding an ISOBMFF fullBox CoverageInformationBox( ) into a SubPictureComposition-Box, it is also possible to include the SphereRegionOnStruct directly, as follows:

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
    SphereRegionStruct(1);
}
```

Still as an alternative, the presence of coverage information for the composition can be conditioned to the value of an additional parameter for instance denoted is_coverage_info_is_present as illustrated below:

```
aligned(8) class SubPictureCompositionBox extends
TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
    unsigned int (1) is_coverage_info_is_present
    unsigned int(7) reserved
    if (is_coverage_info_is_present == 1)
        SphereRegionStruct(1); // or full CoverageInformationBox( )
}
```

Indeed as the SubPictureCompositionBox is defined in all tracks that pertain to the group defined by this SubPictureCompositionBox, if there is a composite track in the track group, the composition coverage information can be defined only for this composite track and does not need to be defined for each tile track.

As a second embodiment, track coverage information and composition coverage information can be signaled using a single common CoverageInformationBox with a flag value to distinguish local and global indication. Since CoverageInformationBox is a ISOBMFF FullBox, the distinction between track and global coverage can be expressed through the flags parameter of the box.

According to this second embodiment, the CoverageInformation Box is defined as follows:

```
Box Type:      'covi'
Container:     Projected omnidirectional video box ('povd')
Mandatory:     No
Quantity:      Zero or more
aligned(8) class CoverageInformationBox extends FullBox('covi',
version = 0, flags) {
    unsigned int(8) coverage_shape_type;
    SphereRegionStruct(1);
}
```

The structure of the box is almost the same as in previous embodiment except that multiple instances of the box can be defined in case local and composition coverage information must be defined in a same track.

The CoverageInformationBox is then defined as providing information on the area on the sphere covered by the content. The nature of the content is given by the flags parameter. The default value for the Coverage Information flags is 0, meaning that this box describes the coverage of the entire content. If this track belongs to a sub-picture composition track group, the entire content refers to the content represented by all tracks belonging to the same sub-picture composition track group, and a composition picture composed from these tracks is referred to as a packed picture of the entire content. Otherwise, the entire content refers to the content represented by this track itself, and the picture of a sample in this track is referred to as a packed picture of the entire content.

When the value for the Coverage Information flags is 1, this box describes the spherical area covered by the packed pictures of the content represented by this track.

The absence of this box indicates that the content covers the entire sphere.

In addition, a new flag value is defined as follows:

Coverage_local: Indicates that the coverage information is local to the track containing the box. Flag value is 0x000001. By default, this value is not set.

As an alternative to second embodiment, the definition of the CoverageInformationBox can include a track_group_id to identify the track group (for example the one of a 'spco' box) represented by the CoverageInformation Box with global coverage information.

The CoverageInformation Box is then defined as follows:

```
Box Type:      'covi'
Container:     Projected omnidirectional video box ('povd')
Mandatory:     No
Quantity:      Zero or more
aligned(8) class CoverageInformationBox extends FullBox('covi',
version = 0, flags) {
    unsigned int(8) coverage_shape_type;
    if (flags & Coverage_local ==0)
        unsigned int(32) track_group_id;
    SphereRegionStruct(1);
}
```

As an alternative, in a third embodiment, two different boxes are defined to describe either composition coverage information (TrackCoverageInformationBox) or track coverage information (TrackCoverageInformationBox). Boxes are defined as follows with same semantics than previous embodiments except that CompositionCoverageInformationBox can be defined multiple times in a track if this track pertains to multiple track group. A parameter track_group_id allows identifying the track group (for example the one of a 'spco' box) described by the CompositionCoverageInformation Box.

```
Box Type:      'covt'
Container:     Projected omnidirectional video box ('povd')
Mandatory:     No
Quantity:      Zero or one
aligned(8) class TrackCoverageInformationBox extends FullBox('covi',
version = 0, flags) {
    unsigned int(8) coverage_shape_type;
    SphereRegionStruct(1);
}
```

```
Box Type:      'covi'
Container:     Projected omnidirectional video box ('povd')
Mandatory:     No
Quantity:      Zero or more
aligned(8) class CompositionCoverageInformationBox extends
FullBox('covi', version = 0, flags) {
```

```
    unsigned int(8) coverage_shape_type;
    unsigned int(32) track_group_id;
    SphereRegionStruct(1);
}
```

As an alternative, in a fourth embodiment, it is possible to combine the embodiments with the CoverageInformationBox using a flags (embodiment 2) to distinguish track and composition coverage information and the ability to define the CoverageInformationBox either in a SubPictureCompositionBox track group ('spco') or in a Projected omnidirectional video box ('povd') in a VisualSampleEntry (embodiment 1). By allowing both approaches, this offers flexibility in coverage signaling depending on the encapsulation mode for the OMAF content:

Single track encapsulation: a single CoverageInformationBox may be declared in the 'povd' box of the track (with Coverage_local flags value not set)

Multiple tracks encapsulation:
  With a composite track: the global coverage information is declared in a CoverageInformationBox inside the 'povd' of this composite track (with flags value Coverage_local not set). Optionally, the sub-picture tracks can declare CoverageInformationBox (with flags value Coverage_local set).
  Without composite track: the composition coverage information is declared in a CoverageInformationBox inside the 'spco' box with the flags value Coverage_local not set. Optionally, the sub-picture tracks can declare CoverageInformationBox (with flags value Coverage_local set).

As an alternative, in a fifth embodiment, if the composition of tracks is described using a new entity group rather than using the track group ('trgr') mechanism, i.e. by defining a particular EntityToGroupBox in GroupsListBox of a file-level MetaBox or in GroupsListBox of a movie-level MetaBox, then composition coverage information can be directly defined as a property of this particular EntityToGroupBox, i.e. a CoverageInformation box as described in first embodiment above could be directly declared inside this particular EntityToGroupBox. Track-related coverage information would still be defined in a Projected omnidirectional video box in a VisualSampleEntry in a track.

This particular entity group may looks like (based on the entity group 'egco' defined in reference to step 250):

```
    aligned(8) class EntityToGroupBox('egco', version, flags)
    extends FullBox('egco', version, flags) {
        unsigned int(32) group_id;
        unsigned int(32) num_entities_in_group;
        for (i=0; i<num_entities_in_group; i++)
            unsigned int(32) entity_id;
        unsigned int (16) composition_width;
        unsigned int (16) composition_height;
        CoverageInformationBox( );
    }
``` or, it is also possible to include the SphereRegionOnStruct directly as follows:

```
    aligned(8) class EntityToGroupBox('egco', version, flags)
    extends FullBox('egco', version, flags) {
        unsigned int(32) group_id;
        unsigned int (32) num_entities_in_group;
        for (i=0; i<num_entities_in_group; i++)
            unsigned int(32) entity_id;
        unsigned int (16) composition_width;
        unsigned int (16) composition_height;
        SphereRegionStruct (1);
    }
```

As an alternative, in a sixth embodiment, it is also possible to decide or not whether Coverage info is present or not in a track group box 'spco' by relying on track handler type. Assuming main track has 'vide' handler type and sub-picture tracks have 'auxv' or 'subv' tracks: the is_coverage_info_is_present flag of the 'spco' box is set to 0 for 'auxv' or 'subv' tracks (i.e. no Coverage info is present) and set to 1 (i.e. coverage info is present) for 'vide' tracks.

Going back to FIG. 2, at step 280, it is checked if the virtual reality media content is actually stereoscopic virtual reality media content, i.e. comprises left and right views.

If the content is only monoscopic, the process directly goes to step 290.

If the content is stereoscopic, stereoscopic signalling is added to the encapsulation at step 285.

For stereoscopic content, classically, both left and right view sequences are acquired from a stereoscopic camera and are composited into a video sequence or two video sequences according to a composition type.

The process to combine two frames representing two different views of a stereoscopic content into one single frame is called frame packing (see step 125 in FIG. 1).

Frame packing consists in packing two views that form a stereo pair into a single frame. There exists several well-known and used frame packing schemes: side by side, top-bottom, frame sequential, vertical line interleaved type . . . For example, the MPEG application format ISO/IEC 23000-11 1$^{st}$ edition ("Stereoscopic video application Format") or ISO/IEC 23001-8 2$^{nd}$ edition ("Coding-independent code-points (CICP)") defines some of these schemes. Frame packing can also consist in keeping each view in separate frames like for example the VideoFramePackingType having the value 6 defined in ISO/IEC 23001-8 2$^{nd}$ edition ("CICP").

For instance, still according to this specification, the value 3 signals that each decoded frame contains a side-by-side packing arrangement of corresponding frames of two constituent views, the value 4 signals that each decoded frame contains a top-bottom packing arrangement of corresponding frames of two constituent views.

In order to signal if a track contains stereoscopic media data, a StereoVideoBox is defined in VisualSampleEntry in the track.

A StereoVideoBox is an ISOBMFF structure to describe stereoscopic content. The StereoVideoBox is used to indicate that decoded frames in a video track either contain a representation of two spatially packed constituent frames that form a stereo pair or contain one of two views of a stereo pair. Parameters in the StereoVideoBox provides information on the arrangements or packing of the views into a frame. The StereoVideoBox is described in the sample descriptions part of a media file providing requirements on the player to be able to decode and render the media file.

A StereoVideoBox is defined as follows (according to ISO/IEC 14496-12):

```
Box Type:              'stvi '
Container:             SchemeInformationBox ('schi')
Mandatory:             Yes (when the SchemeType is 'stvi')
Quantity:              One
aligned(8) class StereoVideoBox extends extends FullBox('stvi',
version = 0, 0)
{
   template unsigned      int(30) reserved = 0;
   unsigned int (2)       single_view_allowed;
   unsigned int(32)       stereo_scheme;
   unsigned int(32)       length;
   unsigned int(8)[length] stereo_indication_type;
   Box[ ] any box; // optional
}
```

Where single_view_allowed indicates that the content may only be displayed on stereoscopic displays or which view can be used to display on a monoscopic single-view display, stereo_scheme is an integer that indicates the stereo arrangement scheme used and the stereo indication type according to the used scheme, and stereo_indication_type indicates the stereo arrangement type according to the used stereo indication scheme.

If the StereoVideoBox allows describing the frame packing scheme used to packed left view frames and right view frames within common packed frames forming one single track, it does not allow easy description when left view and right view are packed in separate tracks in the context of ISO/IEC 23090-2 (MPEG OMAF).

Moreover, MPEG OMAF specification only allows values 3 and 4 for side-by-side and top-bottom frame packing of the stereo views respectively and recommends describing stereo content with a StereoVideoBox as follows:

```
aligned(8) class StereoVideoBox extends FullBox('stvi', version = 0,
0)
{
   template unsigned      int(30) reserved = 0;
   unsigned int (2)       single_view_allowed;
   unsigned int(32)       stereo scheme; // = 4 to refer CICP ISO/IEC
23001-8;
   unsigned int(32)       length; // = 2
   unsigned int(8) [length] stereo_indication_type;
      // = {3, 4} for side-by-side frame packing or
      // = {4, 0} for top-bottom frame packing
   Box[ ] any_box; // optional
}
```

But this specification does not allow describing stereo views in separate tracks.

In order to simplify the description of stereoscopic content and avoid repeating stereoscopic information in different OMAF descriptors, the StereoVideoBox can be extended to support any type of view encapsulation or packing, whatever views are packed within a single frame or encapsulated in separate tracks.

First some restrictions can be enforced to the encapsulation process: if stereo views have different characteristics, for example in region-wise quality ranking then each view must be encapsulated in its own track and the StereoVideoBox for each track must have stereo_scheme=4 (i.e. must use frame packing as defined in CICP ISO/IEC 23001-8), and stereo_indication_type={6,0}, meaning that the decoded frame constitutes a complete 2D frame without any frame packing.

By doing so, there is no need to repeat somewhere else view identifiers (view_idc) in OMAF descriptors such as in SphereRegionQualityRankingBox or 2DRegionQualityRankingBox. By parsing the track, a player can determine whether:
   The track contains monoscopic content (no StereoVideoBox)
   The track contains stereoscopic content (presence of StereoVideoBox)
      When stereo, whether it contains one view (referencing or referenced by a tref='svdp') or both view
      When stereo and containing a single view, the view identifier through the StereoVideoBox (as explained below)

By defining a StereoVideoBox with stereo_scheme=4, and stereo_indication_type={6,0} for each track comprising either a left view or a right view, it allows signaling that the content is part of a stereoscopic content but it doesn't allow to identify which track is the left of right view.

Left and right views are then identified using a track reference of type 'svdp'. The track containing the reference track 'svdp' is identified as a reference track, which has a dependency to a referenced track, and also contains the stereoscopic related meta information.

Moreover, to indicate which view a track corresponds to, the couple of parameters (single_view_allowed, stereo_indication_type) is used.

The semantics for single_view_allowed is defined as follows:

"When the stereo_scheme=4 and stereo_indication_type indicates "no-packing", i.e. stereo_indication_type={6, 0}, the single_view_allowed &1 equal to 1 indicates that the track contains the right view and single_view_allowed &2 equal to 2 indicates that the track contains the left view. In this case, the value 0 and 3 are forbidden".

As an alternative, to avoid modifying the existing semantic of single_view_allowed parameter, a new version of the StereoVideoBox is defined that provides an additional 1-bit parameter "is_left_view" to signal if the track contains the left view (is_left_view=1) or the right view (is_left_view=0).

```
aligned(8) class StereoVideoBox extends FullBox('stvi', version, 0)
{
   if (version >= 1)
   {
      template unsigned      int(29) reserved = 0;
      unsigned int(1)        is_left_view;
   }
   else
   {
      template unsigned int(30) reserved = 0;
   }
   unsigned int(2)        single_view_allowed;
   unsigned int(32)       stereo scheme; // = 4 to refer CICP ISO/IEC
23001-8;                  length; // = 2
   unsigned int(32)
   unsigned int(8) [length] stereo_indication_type;
      // = {3, 0} for side-by-side frame packing or
      // = {4, 0} for top-bottom frame packing or
      // = {6, 0} for no-packing and left/right views signaling
provided by is_left_view parameter
   Box[ ] any_box; // optional
}
```

Alternatively, the additional parameter is a 2-bit parameter "view_idc" (as illustrated below) with the following semantic: if it equals to 0 indicates that the media content in the track is monoscopic, 1 indicates that the media content in the track is the left view of stereoscopic content, 2 indicates that the media content in the track is the right view of stereoscopic content, 3 indicates that the media content in the track includes both the left and right views.

```
aligned(8) class StereoVideoBox extends FullBox('stvi', version, 0)
{
  if (version >=1)
  {
    template unsigned int(28) reserved = 0;
    unsigned int(2)     view_idc;
  }
  else
  {
    template unsigned int(30) reserved = 0;
  }
  unsigned int (2)  single_view_allowed;
  unsigned int(32) stereo_scheme; // = 4 to refer CICP ISO/IEC 23001-8;
  unsigned int(32) length; // = 2
  unsigned int(8) [length] stereo_indication_type;
    // = {3, 0} for side-by-side frame packing or
    // = {4, 0} for top-bottom frame packing or
    // = {6, 0} for no-packing and left/right views signaling
  provided by view_idc parameter
  Box[ ] any box; // optional
}
```

As another alternative, rather than adding a new parameter and creating a new version of the StereoVideoBox, a new frame packing arrangement is defined for the stereo_scheme=4 (corresponding to an extension of CICP ISO/IEC 23001-8), i.e. a new value is defined, for instance 7, for the parameter stereo_indication_type when stereo_scheme=4. This new value is defined as follows:

VideoFramePackingType=7 indicates the decoded frame contains one single plane of corresponding planes of two constituent frames (i.e. either the left view or the right view of a stereoscopic sequence).

In addition to this new VideoFramePackingType value and to the existing associated flag QuincunxSamplingFlag that signals whether a quincunx sampling structure is used in the frame packed video representation, a new associated flag, for instance denoted ViewIdcFlag is defined allowing to identify the type of views present in the frame packed video representation. When not present or not specified or the value 0 for ViewIdcFlag would be inferred to indicate that both the left and right views are present, the value 1 indicates that only the left view of stereoscopic content is present, the value 2 indicates that only the right view of stereoscopic content is present, and all other values of ViewIdcFlag are reserved for future use by ISO/IEC.

The definition of stereo_scheme=4 in the StereoVideoBox is then modified as follows:

"stereo_scheme equal to 4: The value of length shall be 2 and stereo_indication_type shall contain two syntax elements of unsigned int(8). The first syntax element shall contain a VideoFramePackingType from ISO/IEC 23001-8. For VideoFramePackingType from value 0 to 6, the least significant bit of the second syntax element shall contain the value of QuincunxSamplingFlag as specified in ISO/IEC 23001-8, while the other bits are reserved and shall be set to 0. For VideoFramePackingType with value 7, the least significant 2-bit of the second syntax element identifies the left view and the right view and shall contain the value of ViewIdcFlag (as defined above), while the other bits are reserved and shall be set to 0".

As an alternative both QuincunxSamplingFlag and ViewIdcFlag can be signaled simultaneously by defining stereo_scheme=4 in the StereoVideoBox as follows:

"stereo_scheme equal to 4: The value of length shall be 3 and stereo_indication_type shall contain three syntax elements of unsigned int(8). The first syntax element shall contain a VideoFramePackingType from ISO/IEC 23001-8. The least significant bit of the second syntax element shall contain the value of QuincunxSamplingFlag as specified in ISO/IEC 23001-8, while the other bits are reserved and shall be set to 0. The least significant 2-bit of the third syntax element identifies the left view and the right view and shall contain the value of ViewIdcFlag (as defined above), while the other bits are reserved and shall be set to 0".

As an example, according to above alternative, the StereoVideoBox would remain unchanged with possible value shown in comments as follows:

```
aligned(8) class StereoVideoBox extends FullBox('stvi', version = 0, 0)
{
  template unsigned      int(30) reserved = 0;
  unsigned int(2)        single_view_allowed;
  unsigned int(32)       stereo_scheme; // = 4 to refer CICP ISO/IEC 23001-8;
  unsigned int(32) length; // = 3
  unsigned int(8) [length] stereo_indication_type;
    // = {3, 0, 0} for side-by-side frame packing or
    // = {4, 0. 0} for top-bottom frame packing or
    // = {7, 0, 1} for single left view packing or
    // = {7, 0, 2} for single right view packing
  Box[ ] any_box; // optional
}
```

As an alternative both QuincunxSamplingFlag and ViewIdcFlag can be optionally signaled by defining stereo_scheme=4 in the StereoVideoBox as follows:

"stereo_scheme equal to 4: The value of length shall be either 1, 2 or 3 and stereo_indication_type shall contain one, two or three syntax elements of unsigned int(8) respectively. The first syntax element shall contain a VideoFramePackingType from ISO/IEC 23001-8. The least significant bit of the second syntax element, if present, shall contain the value of QuincunxSamplingFlag as specified in ISO/IEC 23001-8, while the other bits are reserved and shall be set to 0. The least significant 2-bit of the third syntax element, if present, identifies the left view and the right view and shall contain the value of ViewIdcFlag (as defined above), while the other bits are reserved and shall be set to 0". The second syntax element shall be present if the third syntax element is present.

As another alternative, frame packing arrangements for stereoscopic Omnidirectional media organizing left and right views in separate tracks can be signalled using the stereo_scheme equal to 3 (use frame packing as defined in ISO/IEC 23000-11 1$^{st}$ edition ("Stereoscopic video application Format")) instead of 4 (use frame packing as defined in CICP ISO/IEC 23001-8). According to StereoVideoBox definition in ISO/IEC 14496-12 4$^{th}$ edition:

stereo_scheme equals to 3 indicates that the value of length shall be 2 and stereo_indication_type shall contain two syntax elements of unsigned int(8). The first syntax element shall contain the stereoscopic composition type from Table 4 of ISO/IEC 23000-11:2009. The least significant bit of the second syntax element shall contain the value of is_left_first as specified in 8.4.3 of ISO/IEC 23000-11:2009, while the other bits are reserved and shall be set to 0.

Thus it is possible to signal that a track contains the left view or the right view of a stereoscopic content by defining in this track a StereoVideoBox with stereo_scheme equal to 3 and by defining the first syntax element of stereo_indication_type with value 0×3 (meaning that the track represents a Left/Right view sequence type, i.e. either the left or the right view only) and by defining the second syntax element as 0 to signal that left view is the secondary view or 1 to signal that left view is the primary view. Primary view and secondary views are identified thanks to the track reference 'svdp' that links left-view and right-view tracks. The track with a 'tref' box of type 'svdp' is the secondary view sequence, and the referenced track is the primary view sequence.

It can be noted that StereoVideoBox's size in embodiments creating a new version of the StereoVideoBox (denoted version=1) could be reduced compared to version 0 by allocating less bytes to the few values authorized for stereo_scheme and stereo_indication_type.

In an alternative a more compact version 1 of the StereoVideoBox for the embodiment introducing new parameter view_idc can be described as follows (saving 6 bytes):

```
aligned(8) class StereoVideoBox extends FullBox('stvi', version = 1, 0)
{
    template unsigned    int(28) reserved = 0;
    unsigned int(2)      view_idc;
    unsigned int(2)      single_view_allowed;
    unsigned int(8)      stereo_scheme; // = 4 to refer CICP ISO/IEC 23001-8;
    unsigned int(8)      length; // = 2 as in CICP indication
    unsigned int(8) [length] stereo_indication_type; // = {3, 0} or {4, 0}
    Box[ ] any_box; // optional
}
```

Similarly, the same compact version can be defined if the additional parameter is "is_left_view" instead of "view_idc".

Furthermore, when the frame packing results in one packed frame per view, the DASH Multiple views scheme may be used in a Role element at adaptation set level to describe the stereo pairs.

According to all above embodiments, the view_idc and viewidc_presence_flag parameters in SphereRegionQualityRankingBox and 2DRegionQualityRankingBox are removed as no more needed when views are split into different tracks as follows:

```
aligned(8) class SphereRegionQualityRankingBox extends FullBox('srqr', version = 0, 0) {
    unsigned int(8) region_definition_type;
    unsigned int(8) num_regions;
    unsigned int(1) remaining_area_flag;
    unsigned int(1) view_idc_presence_flag;
    bit (7 6 ) reserved = 0;
    if (view_idc_presence_flag == 0) {
        unsigned int(2) default_view_idc;
        bit (6) reserved = 0;
    }
    for (i = 0; i < num_regions; i++) {
        unsigned int(8) quality_ranking;
        if (view_idc_presence_flag == 1) {
            unsigned int(2) view_idc;
            bit (6) reserved = 0;
        }
        if ((i < (num_regions - 1)) || (remaining_area_flag == 0))
            SphereRegionStruct(1);
    }
}
aligned(8) class 2DRegionQualityRankingBox extends FullBox('2dqr', version = 0, 0) {
    unsigned int(8) num_regions;
    unsigned int(1) remaining_area_flag;
    unsigned int(1) view_idc_presence_flag;
    bit(7 6 ) reserved = 0;
    for (i = 0; i < num_regions; i++) {
        unsigned int(8) quality_ranking;
        unsigned int(1) view_idc_presence_flag;
        unsigned int(2) view_idc;
        bit (6) reserved = 0;
        if ((i < (num_regions - 1)) || (remaining_area_flag == 0)) {
            unsigned int(16) left_offset;
            unsigned int(16) top_offset;
            unsigned int(16) region_width;
            unsigned int(16) region_height;
        }
    }
}
```

As an alternative, the view_idc and view_idc_presence_flag parameters are conditioned to a particular version of SphereRegionQualityRankingBox or 2DRegionQualityRankingBox as illustrated below:

```
aligned(8) class SphereRegionQualityRankingBox extends FullBox('srqr', version, 0) {
    unsigned int(8) region_definition_type;
    unsigned int(8) num_regions;
    unsigned int (1) remaining_area_flag;
    if (version >=1)
    {
        unsigned int (1) view_idc_presence_flag;
        if (view_idc_presence_flag == 0) {
            unsigned int(2) default_view_idc;
            bit(4) reserved = 0;
        }else{
            bit(6) reserved = 0;
        }
    }else{
        bit(7) reserved = 0;
    }
    for (i = 0; i < num_regions; i++) {
        unsigned int(8) quality_ranking;
        if (version >= 1)
        {
            if (view_idc_presence_flag == 1) {
                unsigned int(2) view_idc;
                bit (6) reserved = 0;
            }
        }
        if ((i < (num regions - 1)) || (remaining area flag == 0))
            SphereRegionStruct(1);
    }
}
aligned(8) class 2DRegionQualityRankingBox extends FullBox('2dqr', version, 0) {
    unsigned int(8) num_regions;
    unsigned int (1) remaining_area_flag;
    if (version >=1)
    {
        unsigned int (1) view_idc_presence_flag;
        if (view_idc_presence_flag == 0) {
            unsigned int(2) default_view_idc;
            bit(4) reserved = 0;
        }else{
            bit(6) reserved = 0;
        }
    }else{
        bit(7) reserved = 0;
    }
    for (i = 0; i < num regions; i++) {
        unsigned int(8) quality_ranking;
        if (version >= 1)
        {
            if (view_idc_presence_flag == 1) {
                unsigned int(2) view_idc;
                bit(6) reserved = 0;
            }
        }
    }
}
```

```
        if ((i < (num_regions - 1)) || (remaining_area_flag == 0)) {
            unsigned int(16) left_offset;
            unsigned int(16) top_offset;
            unsigned int(16) region_width;
            unsigned int(16) region_height;
        }
    }
}
```

Indeed, when a track only contains either the entire left view or the entire right view, it is not necessary to include a view_idc (signalling the stereoscopic view) for each quality ranking region defined in this track. In such a case the version=0 of those boxes is used. Otherwise, if the track contains packed views, then the version=1 of those boxes is used.

Parsing media files generated according to embodiments of the invention, where the media files comprise encoded media data corresponding to a wide view of a scene, may comprise by the client the following steps. At least one track encapsulating the encoded media data is identified in the media files. Information relating to necessity of data for decoding the encoded media data encapsulated in a given track is obtained from the media files. The encoded media data of the given track are decoded according to the obtained information.

Figure 3:
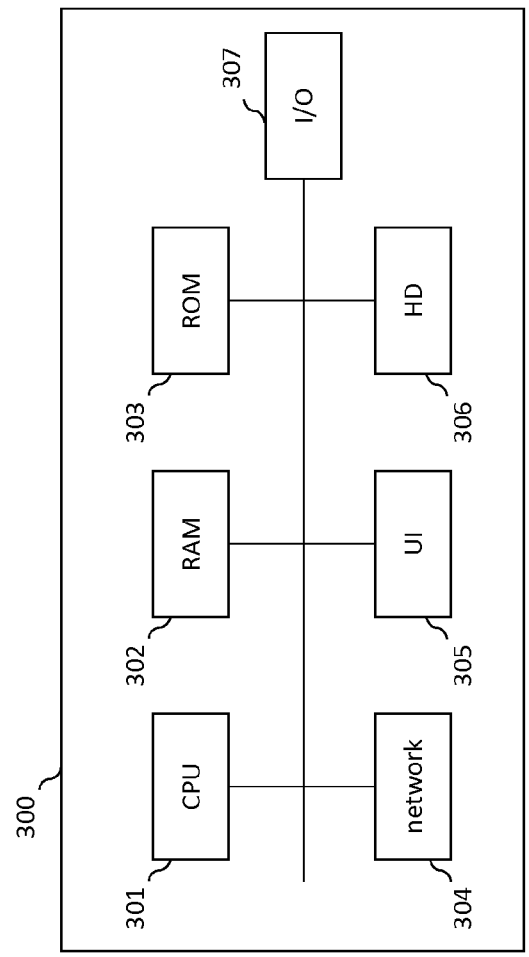
FIG. 3 is a schematic block diagram of a computing device for implementation of one or more embodiments of the invention.

FIG. 3 is a schematic block diagram of a computing device 300 for implementation of one or more embodiments of the invention. The computing device 300 may be a device such as a micro-computer, a workstation or a light portable device. The computing device 300 comprises a communication bus connected to:

- a central processing unit (CPU) 301, such as a microprocessor;
- a random access memory (RAM) 302 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory (ROM) 303 for storing computer programs for implementing embodiments of the invention;
- a network interface 304 that is, in turn, typically connected to a communication network over which digital data to be processed are transmitted or received. The network interface 304 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 301;
- a user interface (UI) 305 for receiving inputs from a user or to display information to a user;
- a hard disk (HD) 306;
- an I/O module 307 for receiving/sending data from/to external devices such as a video source or display.

The executable code may be stored either in read only memory 303, on the hard disk 306 or on a removable digital medium such as for example a disk. According to a variant, the executable code of the programs can be received by means of a communication network, via the network interface 304, in order to be stored in one of the storage means of the communication device 300, such as the hard disk 306, before being executed.

The central processing unit 301 is adapted to control and direct the execution of the instructions or portions of software code of the program or programs according to embodiments of the invention, which instructions are stored in one of the aforementioned storage means. After powering on, the CPU 301 is capable of executing instructions from main RAM memory 302 relating to a software application after those instructions have been loaded from the program ROM 303 or the hard-disc (HD) 306 for example. Such a software application, when executed by the CPU 301, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for encapsulating, encoded media data corresponding to a wide view of a scene in one or more media files, the method comprising at a processing device:
   obtaining encoded media data corresponding to the wide view of the scene;
   encapsulating the encoded media data into tracks in the one or more media files, wherein the encapsulating step further comprises:
   providing descriptive metadata for each track, the descriptive metadata being organized into track containers, where a track container is related to a track, and where the track container contains a first box describing the coding format of encoded media data in the track, and a second box describing a common set of tracks, and
   providing a first structure comprising coverage information;
   encapsulating the first structure in the second box when the coverage information indicates the coverage of the wide view represented by encoded media data encapsulated in all tracks belonging to the common set defined by the second box; and encapsulating the first structure in the first box when the coverage information indicates the coverage of the wide view represented by encoded media data encapsulated in the track itself.

2. The method of claim 1, wherein the common set is a 'track group' defined by ISOBMFF 14496-12.

3. The method of claim 2, wherein the first second box is a 'track group' box defined by ISOBMFF 14496-12.

4. The method of claim 1, further comprising a testing step for testing whether a reference track comprising only descriptive metadata about the tracks, is generated, the generating step further comprises when a reference track is generated, then encapsulating the first structure in the box of the reference track, the coverage information of the first structure indicating the coverage of the wide view represented by encoded media data encapsulated in all tracks referenced by the reference track.

5. A method for parsing media files by a processing device, said media files corresponding to encoded media data corresponding to a wide view of a scene, the method comprising:

obtaining tracks encapsulating the encoded media data, from the media files;

obtaining descriptive metadata from each track, the descriptive metadata being organized into track containers, where a track container is related to a track, and where the track container contains a first box, describing the coding format of encoded media data in the track, and a second box describing a common set of tracks;

wherein obtaining descriptive metadata further comprises obtaining a first structure comprising:

when the first structure is in the second box, information to indicate the coverage of the wide view represented by encoded media data encapsulated in all tracks belonging to the common set defined in the second box, when the first structure is in the first box, information to indicate the coverage of the wide view represented by encoded media data encapsulated in the track itself.

6. A device for encapsulating, encoded media data corresponding to a wide view of a scene, the device comprising a processor configured for:

obtaining encoded media data corresponding to the wide view of the scene, encapsulating the encoded media data into tracks in the one or more media files, wherein the encapsulating step further comprises:

providing descriptive metadata for each track, the descriptive metadata being organized into track containers, where a track container is related to a track, and where the track container contains a first box describing the coding format of encoded media data in the track, and a second box describing a common set of tracks, and providing a first structure comprising coverage information;

encapsulating the first structure in the second box when the coverage information indicates the coverage of the wide view represented by encoded media data encapsulated in all tracks belonging to the common set defined by the second box; and encapsulating the first structure in the first box when the coverage information indicates the coverage of the wide view represented by encoded media data encapsulated in the track itself.

7. A device for parsing media files, said media files corresponding to encoded media data corresponding to a wide view of a scene, the device comprising a processor configured for:

obtaining tracks encapsulating the encoded media data, from the media files;

obtaining descriptive metadata from each track, the descriptive metadata being organized into track container, where a track container is related to a track, and where the track container contains a first box, describing the coding format of encoded media data in the track, and a second box describing a common set of tracks;

wherein obtaining descriptive metadata further comprises obtaining a first structure comprising:

when the first structure is in the second box, information to indicate the coverage of the wide view represented by encoded media data encapsulated in all tracks belonging to the common set defined in the second box, when the first structure is in the first box, information to indicate the coverage of the wide view represented by encoded media data encapsulated in the track itself.

8. The device according to claim 6, wherein the encoded media data or encoded video data are encoded omnidirectional data or encoded omnidirectional video data.

9. The method of claim 5, further comprising a testing step for testing whether a reference track comprising only descriptive metadata about the tracks, is obtained, the obtaining descriptive metadata step further comprises when a reference track is obtained, then obtaining the first structure in the box of the reference track, the coverage information of the first structure indicating the coverage of the wide view represented by encoded media data encapsulated in all tracks referenced by the reference track.

10. The method of claim 5, further comprising a testing step for testing whether a reference track comprising only descriptive metadata about the tracks, is obtained, the obtaining descriptive metadata step further comprises if when a reference track is obtained, then obtaining the first structure in the box of the reference track, the coverage information of the first structure indicating the coverage of the wide view represented by encoded media data encapsulated in all tracks referenced by the reference track.

* * * * *